(12) United States Patent
Nishizaki

(10) Patent No.: US 9,479,659 B2
(45) Date of Patent: Oct. 25, 2016

(54) IMAGE PROCESSING APPARATUS AND OPERATIONS THEREOF

(71) Applicant: BROTHER KOGYO KABUSHIKI KAISHA, Nagoya-shi, Aichi-ken (JP)

(72) Inventor: Mayumi Nishizaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 9 days.

(21) Appl. No.: 14/497,893

(22) Filed: Sep. 26, 2014

(65) Prior Publication Data

US 2015/0092236 A1   Apr. 2, 2015

(30) Foreign Application Priority Data

Sep. 30, 2013   (JP) .................................. 2013-205177

(51) Int. Cl.

| G06K 15/00 | (2006.01) |
|---|---|
| H04N 1/00 | (2006.01) |
| G06F 3/0481 | (2013.01) |
| G06F 3/0482 | (2013.01) |
| H04N 1/32 | (2006.01) |
| G06F 9/44 | (2006.01) |

(52) U.S. Cl.
CPC ........ *H04N 1/00506* (2013.01); *G06F 3/0482* (2013.01); *G06F 3/04817* (2013.01); *G06F 9/4443* (2013.01); *H04N 1/00411* (2013.01); *H04N 1/00424* (2013.01); *H04N 1/00461* (2013.01); *H04N 1/00466* (2013.01); *H04N 1/32122* (2013.01); *H04N 2201/0094* (2013.01); *H04N 2201/3214* (2013.01)

(58) Field of Classification Search
None
See application file for complete search history.

(56) References Cited

U.S. PATENT DOCUMENTS

| 7,702,542 | B2 * | 4/2010 | Aslanian, Jr. .............. 705/14.73 |
|---|---|---|---|
| 2003/0064757 | A1 * | 4/2003 | Yamadera ............. G06F 3/0482 455/566 |
| 2004/0184069 | A1 * | 9/2004 | Mifune ........................ 358/1.15 |
| 2005/0166158 | A1 * | 7/2005 | Blanchard et al. ........... 715/768 |
| 2006/0187483 | A1 * | 8/2006 | Baba ............................ 358/1.15 |
| 2008/0244397 | A1 | 10/2008 | Ferlitsch |
| 2009/0242622 | A1 * | 10/2009 | Tsukada ............. H04N 1/00968 235/375 |
| 2012/0050788 | A1 * | 3/2012 | Bachman et al. ........... 358/1.15 |
| 2012/0050789 | A1 * | 3/2012 | Bachman et al. ........... 358/1.15 |
| 2014/0129941 | A1 * | 5/2014 | Sato et al. .................... 715/719 |

FOREIGN PATENT DOCUMENTS

| JP | 2006-260544 A | 9/2006 |
|---|---|---|
| JP | 2008-259193 A | 10/2008 |

* cited by examiner

*Primary Examiner* — Marivelisse Santiago Cordero
*Assistant Examiner* — Neil R McLean
(74) *Attorney, Agent, or Firm* — Scully, Scott, Murphy & Presser, PC

(57) ABSTRACT

An image processing apparatus includes a processor to perform: acquiring date information determined based on a current date; selecting an icon to be displayed on the display unit, according to the date information, from a plurality of icons that is used to execute image processing; controlling a display unit such that the display unit displays the selected icon; acquiring selection information specifying an icon selected from the icon displayed on the display unit; and controlling a printing execution unit such that the printing execution unit prints an image by executing the image processing associated with the icon specified. In a case where the date information represents a first date, the processor, in the selecting, configured to select a first icon, and in a case where the date information represents a second date, the processor, in the selecting, configured to select a second icon.

12 Claims, 11 Drawing Sheets

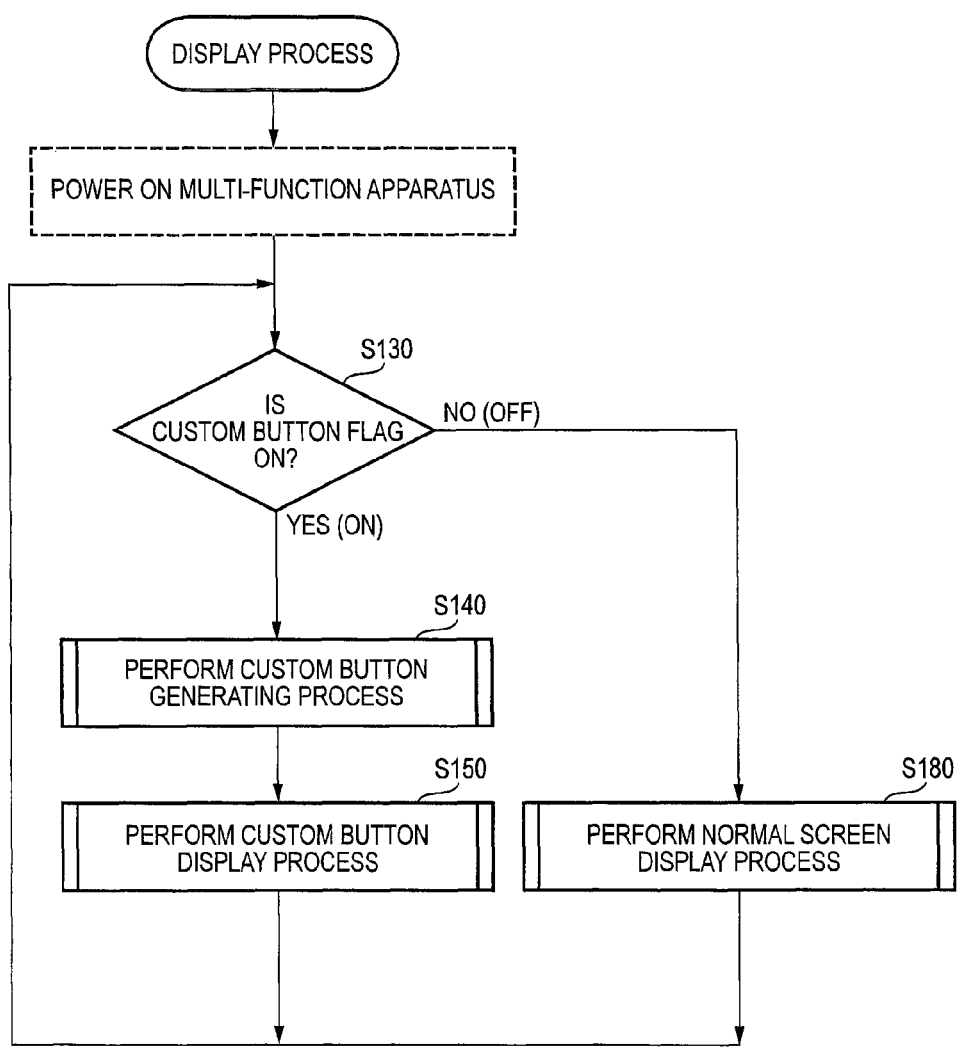

FIG. 5A

| BUTTON NUMBER bi | X COORDINATE bx | Y COORDINATE by | WIDTH bw | HEIGHT bh | BUTTON NAME Bn | CHARACTER SIZE Cs | CHARACTER ARRANGEMENT Ca | PROCESS NUMBER Pn |
|---|---|---|---|---|---|---|---|---|
| 0 | 30 | 30 | 80 | 50 | — | — | — | — |
| 1 | 130 | 30 | 80 | 50 | — | — | — | — |

Btab

FIG. 5B

| BUTTON NUMBER bi | X COORDINATE bx | Y COORDINATE by | WIDTH bw | HEIGHT bh | BUTTON NAME Bn | CHARACTER SIZE Cs | CHARACTER ARRANGEMENT Ca | PROCESS NUMBER Pn |
|---|---|---|---|---|---|---|---|---|
| 0 | 30 | 30 | 80 | 50 | NEW YEAR'S CARD | 10.5 | 1 | 2 |
| 1 | 130 | 30 | 80 | 50 | — | — | — | — |

Btab

FIG. 5C

| BUTTON NUMBER bi | X COORDINATE bx | Y COORDINATE by | WIDTH bw | HEIGHT bh | BUTTON NAME Bn | CHARACTER SIZE Cs | CHARACTER ARRANGEMENT Ca | PROCESS NUMBER Pn |
|---|---|---|---|---|---|---|---|---|
| 0 | 30 | 30 | 80 | 50 | NEW YEAR'S CARD | 10.5 | 1 | 2 |
| 1 | 130 | 30 | 80 | 50 | CHRISTMAS | 9 | 2 | 3 |

Btab

FIG. 7

| PROCESS NUMBER Pn | VALID COUNTRY CODE Ccx | START DATE SD | END DATE ED | BUTTON NAME BN | PRIORITY Pr |
|---|---|---|---|---|---|
| 1 | 0000 | 7/1 | 8/15 | SUMMER GREETING CARD | 1 |
| 2 | 0000 | 11/15 | 1/15 | NEW YEAR'S CARD | 2 |
| 3 | 0000 | 11/25 | 12/25 | CHRISTMAS | 3 |
| 4 | 0001 | 10/1 | 10/31 | Halloween | 4 |
| 5 | 0001 | 11/1 | 12/25 | Xmas | 5 |
| ⋮ | ⋮ | ⋮ | ⋮ | ⋮ | ⋮ |

FIG. 13

| PROCESS NUMBER | START DATE SD | END DATE ED | START DATE PSD OF PRIORITY PERIOD | END DATE PED OF PRIORITY PERIOD | BUTTON NAME Bn | PRIORITY Pr |
|---|---|---|---|---|---|---|
| 1 | 7/1 | 8/15 | – | – | SUMMER GREETING CARD | 1 |
| 2 | 11/15 | 1/15 | 12/25 | 1/5 | NEW YEAR'S CARD | 2 |
| 3 | 11/25 | 12/25 | 12/20 | 12/25 | CHRISTMAS | 3 |
| 4 | 10/1 | 10/31 | – | – | Helloween | 4 |
| 5 | 11/1 | 12/25 | – | – | Xmas | 5 |
| ⋮ | ⋮ | ⋮ | ⋮ | ⋮ | ⋮ | ⋮ |

Ctab2

| PROCESS NUMBER | START DATE SD | END DATE ED | REFERENCE DATE D1 | BUTTON NAME Bn |
|---|---|---|---|---|
| 1 | 7/1 | 8/15 | – | SUMMER GREETING CARD |
| 2 | 11/15 | 1/15 | 12/15 | NEW YEAR'S CARD |
| 3 | 11/25 | 12/25 | 12/10 | CHRISTMAS |
| 4 | 10/1 | 10/31 | – | Helloween |
| 5 | 11/1 | 12/25 | – | Xmas |
| ⋮ | ⋮ | ⋮ | ⋮ | ⋮ |

Ctab2

```
11/15            12/13    12/15           1/15
 | NO. 2          | NO. 2  | NO. 2 | NO. 2 |
       ←           NO. 3    NO. 3         →
      11/25   12/10              12/25
```

IMAGE PROCESSING APPARATUS AND OPERATIONS THEREOF

CROSS-REFERENCE TO RELATED APPLICATION

This application claims priority from Japanese Patent Application No. 2013-205177 filed on Sep. 30, 2013, the entire subject matter of which is incorporated herein by reference.

TECHNICAL FIELD

This disclosure relates to an image processing apparatus and operations thereof.

BACKGROUND

In the background art, an image processing apparatus performs image processing for printing an image, according to an instruction of a user. For example, while referring to a menu or buttons displayed on a liquid crystal monitor, the user operates a touch panel, thereby inputting an instruction to the image processing apparatus.

SUMMARY

However, there is a case where an image may be printed every day or an image may be with printed a low frequency. For example, greeting cards such as Christmas cards are printed only once a year. In this case of performing printing with a low frequency, the load of a user for inputting an image processing instruction is large, and it is often not easy to perform printing.

This disclosure is to provide at least a technology capable of easily performing image processing for printing.

This disclosure was made with considerations of at least a part of the above described situation and can be implemented as follows.

In view of the above, an image processing apparatus includes: a processor; and memory storing instructions therein that, when executed by the processor, cause the processor to perform: acquiring date information determined based on a current date; selecting an icon to be displayed on the display unit, according to the date information, from a plurality of icons that is used to execute image processing for printing different images; controlling a display unit such that the display unit displays the selected icon; acquiring selection information specifying an icon selected from the icon displayed on the display unit; and controlling a printing execution unit such that the printing execution unit prints an image by executing the image processing associated with the icon specified by the selection information. In a case where the date information represents a first date, the processor, in the selecting, configured to select a first icon, and in a case where the date information represents a second date, the processor, in the selecting, configured to select a second icon.

According to this configuration, it is possible to display process association images appropriate for date information which is determined based on a current date. Therefore, it is possible to easily perform image processing appropriate for the date information.

Also, this disclosure can be implemented in various forms such as an image processing method, image processing operations, an image processing apparatus, a computer program for implementing the functions of the image processing method or the image processing apparatus, or a recording medium (for example, a recording medium which is not temporary) having the computer program configured by instructions and recorded therein.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2 is a flow chart illustrating a display process;

FIGS. 5A to 5C are schematic views illustrating examples of display button table data Btab;

FIG. 7 is a schematic view illustrating an example of button definition table data Ctab;

FIG. 13 is a schematic view illustrating another embodiment of the button definition table data; and FIG. 14 is a schematic view illustrating another embodiment of the button definition table data.

DETAILED DESCRIPTION

A. First Embodiment

Figure 1:
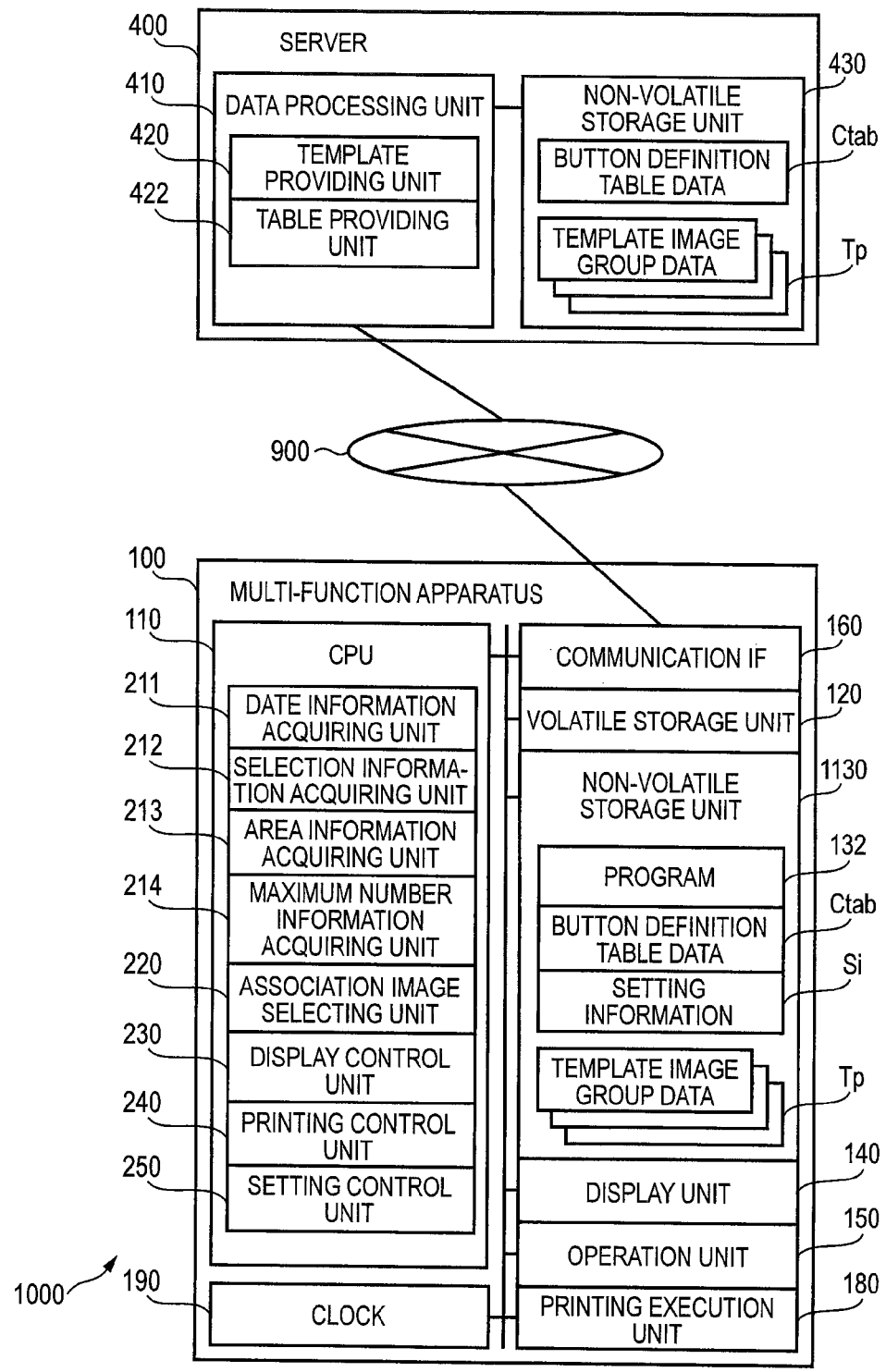
FIG. 1 is an explanatory view illustrating an image processing system as an embodiment of this disclosure.

FIG. 1 is an explanatory view illustrating an image processing system as an embodiment of this disclosure. An image processing system 1000 includes a network 900, a server 400, and a multi-function apparatus 100. Each of the server 400 and the multi-function apparatus 100 is connected to the network 900. The multi-function apparatus 100 prints images according to instructions of a user. The server 400 provides button definition table data Ctab and template image group data Tp to be used in image processing for image printing, to the multi-function apparatus 100.

The server 400 includes a data processing unit 410, and a non-volatile storage unit 430. The non-volatile storage unit 430 is, for example, a hard disk drive, and stores the button definition table data Ctab and the template image group data Tp. The data processing unit 410 is a so-called computer, and includes a processor (for example, a CPU) (not shown), and storage units (for example, a DRAM and a hard disk drive). The processor of the data processing unit 410 executes programs stored in the storage units, thereby implanting the functions of each of processing units of a template providing unit 420 and a table providing unit 422. The template providing unit 420 transmits the template image group data Tp to the multi-function apparatus 100 through the network 900, in response to a request from the multi-function apparatus 100. The table providing unit 422 transmits the button definition table data Ctab to the multi-function apparatus 100 through the network 900, in response to a request from the multi-function apparatus 100.

The multi-function apparatus 100 includes a processor 110, a volatile storage unit 120, a non-volatile storage unit 130, a display unit 140, an operation unit 150, a communication interface 160, a printing execution unit 180, and a clock 190.

The processor 110 is a unit for processing data and is, for example, a so-called CPU. The volatile storage unit 120 is, for example, a so-called DRAM, and the non-volatile storage unit 130 is, for example, a so-called flash memory. The non-volatile storage unit 130 stores a program 132 which can be executed by the processor 110, the button definition table data Ctab, setting information Si representing the setting contents of various operation parameters of the multi-function apparatus 100, and the template image group data Tp. The processor 110 executes the program 132, thereby implementing a variety of functions. In the first embodiment, the processor 110 implements the functions of each of processing units of a date information acquiring unit 211, a selection information acquiring unit 212, a area information acquiring unit 213, a maximum number information acquiring unit 214, an association image selecting unit 220, a display control unit 230, a printing control unit 240, and a setting control unit 250. Each processing unit will be described below in detail. Also, the processor 110 temporarily stores a variety of intermediate data to be used to execute programs (for example, the program 132), in a storage unit (for example, the volatile storage unit 120 or the non-volatile storage unit 130).

The display unit 140 is a unit for displaying images and is, for example, a liquid crystal display. The operation unit 150 is a unit which can be operated by the user and is, for example, a touch panel disposed on the display unit 140 so as to overlap the display unit 140. The user can operate the operation unit 150, thereby inputting a variety of instructions such as an image processing instruction. The communication interface 160 is an interface for connection with a network and is, for example, a wireless interface according to the standards of 802.11a, 802.11b, 802.11g, or 802.11n of IEEE. The communication interface 160 is connected to the network 900. The clock 190 is a clock for measuring a current date and a current time.

The printing execution unit 180 is a unit for printing images onto print media (for example, paper sheets). In the first embodiment, the printing execution unit 180 is a laser type color printer which uses toner of cyan C, magenta M, yellow Y, and black K. However, as the printing execution unit 180, any other type printer (for example, an inkjet type printer) can be used.

FIG. 2 is a flow chart illustrating a display process which is performed by the display control unit 230 of the multi-function apparatus 100 (FIG. 1). If the multi-function apparatus 100 is powered on, the display control unit 230 starts the display process. First, in STEP S130, the display control unit 230 acquires a custom button flag included in the setting information Si stored in the non-volatile storage unit 130, and determines whether the custom button flag is on. The custom button flag in the ON state represents that it is necessary to display any custom button on the display unit 140, and the custom button flag in an OFF state represents that it is unnecessary to display any custom button on the display unit 140. A custom button is a button for performing image processing for image printing. Like this, in the present embodiment, image processing associated with a custom button is an image printing process. Also, in the present embodiment, a plurality of custom buttons can be used, and image processing depending on the custom buttons (that is, processes of printing different images) is performed, as will be described below. The custom buttons will be described below in detail.

Figure 3A:
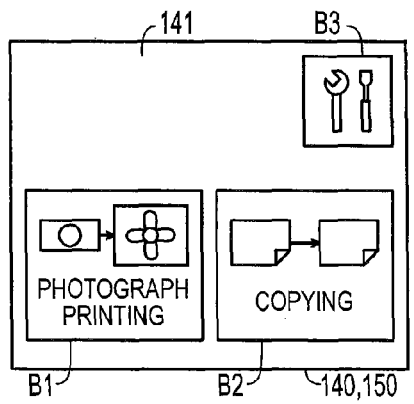
FIGS. 3A to 3F are schematic views illustrating an example of a normal screen, examples of setting screens, and examples of operation screens.

In a case where the custom button flag is OFF state ("NO" in STEP S130), in STEP S180, the display control unit 230 displays a normal screen. FIG. 3A shows an example of the normal screen. A normal screen 141 shown in FIG. 3A displays a first button B1, a second button B2, and a setup button B3. The first button B1 is a button for performing a photograph printing process, and the second button B2 is a button for performing document copying, and the setup button B3 is a button for changing the settings of the multi-function apparatus 100. The user can touch a position of the operation unit 150 (the touch panel in the present embodiment) overlapping a desired button, thereby operating the desired button. The processor 110 (for example, the display control unit 230) can acquire data representing the touched position on the operation unit 150, from the operation unit 150, and specify which button has been operated, based on the touched position. After STEP S180 of FIG. 2, the display control unit 230 returns to STEP S130.

Figure 4:
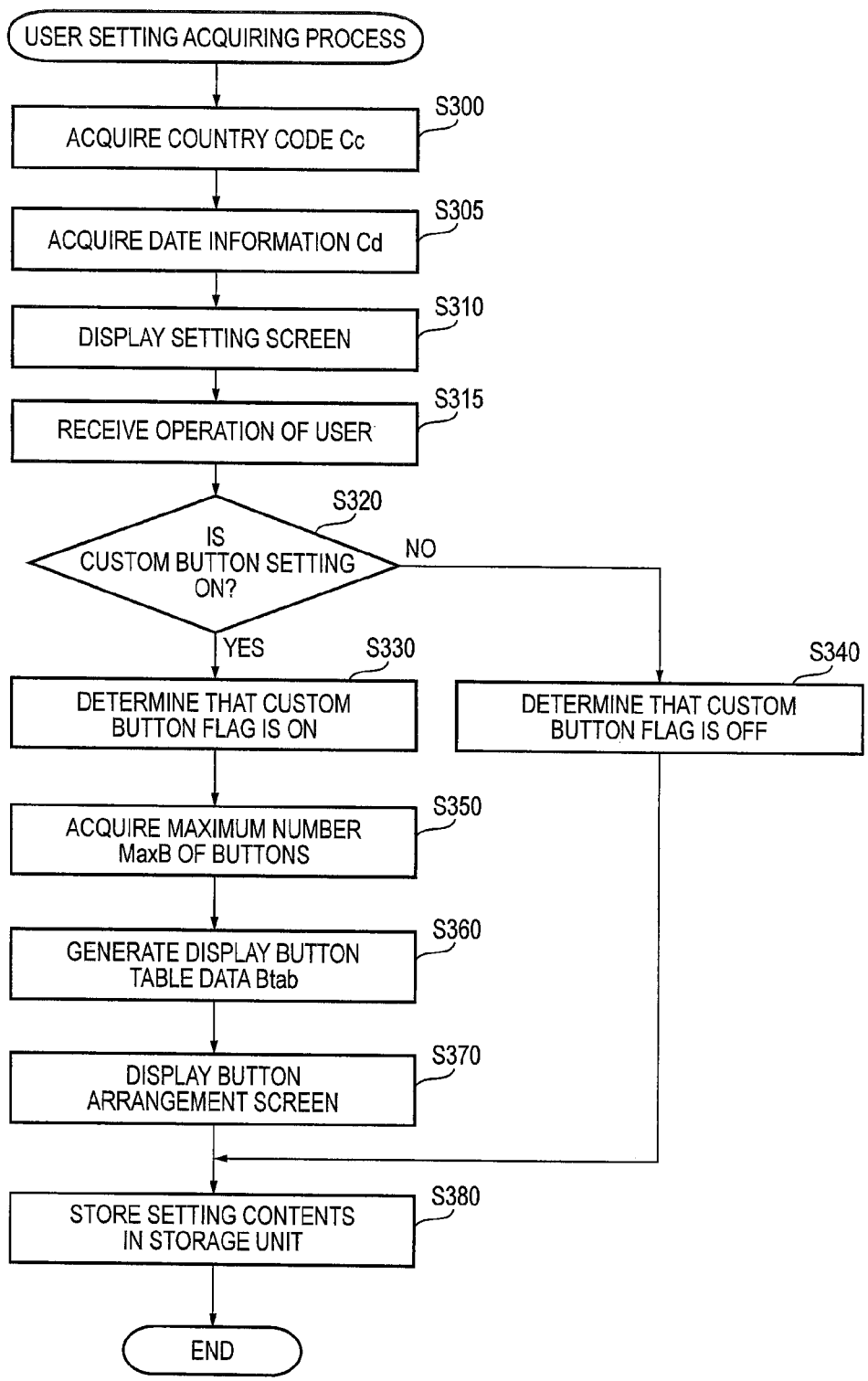
FIG. 4 is a flow chart illustrating a user setting acquiring process.

FIG. 4 is a flow chart illustrating a user setting acquiring process. This process is a process which can be performed independently from the process of FIG. 2. In the present embodiment, if the setup button B3 (FIG. 3A) is operated by the user, the user setting acquiring process is started. First, in STEP S300, the area information acquiring unit 213 (FIG. 1) acquires a country code Cc included in the setting information Si. The country code Cc is information representing a country where the multi-function apparatus 100 is used. The country code Cc is determined, for example, during shipment of the multi-function apparatus 100. Alternatively, the user may determine the country code Cc.

Next, in STEP S305, the date information acquiring unit 211 acquires date information determined based on a current date, from the clock 190. The date information includes at least one of information representing a month, information representing a day, and information representing a day of the week. In the present embodiment, the date information includes information representing a month, information representing a day.

Figure 3B:
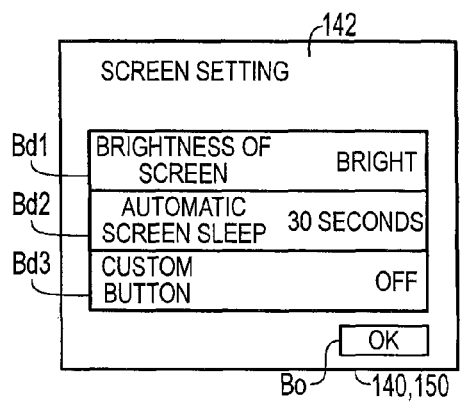

Next, in STEP S310, the display control unit 230 displays a setting screen on the display unit 140. FIG. 3B shows an example of a setting screen. A setting screen 142 displays a brightness setup button Bd1 for setting the brightness of the display unit 140, a sleep setup button Bd2 for setting a time to automatically turn off the display unit 140, a custom button setup button Bd3, and an OK button Bo. The OK button Bo is a button which can be operated by the user if setting is completed. On the buttons Bd1 to Bd3, the current setting contents are displayed respectively. The display control unit 230 acquires information representing the current setting contents, from the setting information Si stored in the non-volatile storage unit 130.

Referring to FIG. 4 again, subsequently, in STEP S315, the display control unit 230 updates the screen displayed on the display unit 140, in response to an operation of the user. For example, if the user operates the setup button Bd3 of FIG. 3B, the display control unit 230 displays a setting screen 143 shown in FIG. 3C. The setting screen 143 displays four buttons Bs0 to Bs3 for performing custom button setting. These buttons Bs0 to Bs3 are associated with setting contents different from each other. The setting contents associated with the buttons Bs0 to Bs3 are as follow. The button Bs0 is an off button Bs0 for turning off the custom button flag. The button Bs1 is a first on button Bs1 for turning on the custom button flag and setting the maximum number of buttons to "1". The button Bs2 is a second on button Bs2 for turning on the custom button flag and setting the maximum number of buttons to "2". The button Bs3 is a third on button Bs3 for turning on the custom button flag and setting the maximum number of buttons to "3".

The maximum number of buttons is the maximum number of custom buttons capable of being displayed once on the display unit 140. The user can operate any one of those buttons Bs0 to Bs3, thereby determining the custom button setting content to the setting content of the operated button.

Figure 3C:
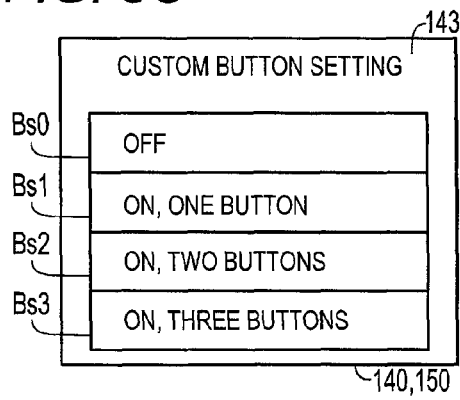

If any one of the buttons Bs0 to Bs3 of FIG. 3C is operated by the user, the display control unit 230 displays an updated setting screen 144 (FIG. 3D) on the display unit 140. If the second on button Bs2 of FIG. 3C is selected, the custom button setting is changed such that the custom button flag becomes on, and the maximum number of buttons becomes "2", like in the example of FIG. 3D.

Figure 3D:
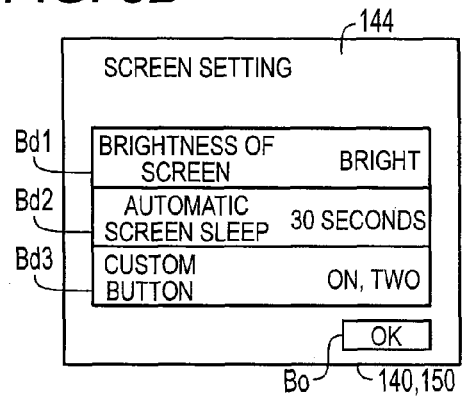

If the user operates an OK button Bo of FIG. 3D, the display control unit 230 finishes STEP S315 of FIG. 4. At this time, the display control unit 230 temporarily stores information (referred to as update setting information) representing operation parameters finally determined in STEP S315, in the volatile storage unit 120. Subsequently, in STEPS S320 to S380, processes relative to custom button setting are performed. Processes for the other operation parameters (for example, the time to automatically turn off the display unit and the brightness shown in FIG. 3B) are not shown in the drawings and will not be described.

Next, in STEP S320, the setting control unit 250 determines whether the custom button setting finally determined in STEP S315 is ON.

If the custom button setting is OFF state ("NO" in STEP S320), in STEP S340, the setting control unit 250 determines that the custom button flag is OFF. Next, in STEP S380, with reference to the update setting information (not shown) stored in the volatile storage unit 120, the setting control unit 250 stores data representing the operation parameters finally determined in STEP S315, as a portion of the setting information Si, in the non-volatile storage unit 130. Thereafter, the process of FIG. 4 finishes.

If the custom button setting is ON state ("YES" in STEP S320), in STEP S330, the setting control unit 250 determines that that custom button flag is ON state. Next, in STEP S350, with reference to the update setting information (not shown) stored in the volatile storage unit 120, the maximum number information acquiring unit 214 acquires the maximum number MaxB of buttons finally determined in STEP S315. Next, in STEP S360, the association image selecting unit 220 generates display button table data Btab according to the maximum number MaxB of buttons, and stores the generated data as a portion of the update setting information, in the volatile storage unit 120.

FIG. 5A is a schematic view illustrating an example of the display button table data Btab which is generated in STEP S360 of FIG. 4. The display button table data Btab defines the configuration of each of custom buttons to be displayed on the display unit 140. The display button table data Btab represents information on as many custom buttons as the maximum number MaxB of buttons. In the example of FIG. 5A, the display button table data Btab represents information on two custom buttons.

In the present embodiment, the display button table data Btab represents associations among button numbers bi, X coordinates bx, Y coordinates by, widths bw, heights bh, button names Bn, character sizes Cs, character arrangements Ca, and process numbers Pn. The button numbers bi are the identifiers of the custom buttons and are integers starting with zero. The X coordinates and the Y coordinates represent the positions of the buttons on the display unit 140. In a case where a specific point (for example, the upper left corner of the display area of the display unit 140) is set as an origin, the X coordinates bx represent coordinates in a predetermined first direction (not shown) in the display unit 140, and the Y coordinates by represent coordinates in a predetermined second direction (not shown) perpendicular to the first direction in the display unit 140. In the present embodiment, the shape of each button is substantially rectangular, and the position of a predetermined portion (upper left corner) of each button is represented by an X coordinate bx and a Y coordinate by. The widths bw represent the lengths of the buttons in the first direction, and the heights bh represent the lengths of the buttons in the second direction. The button names Bn are character strings to be displayed in the buttons, and represent the names of the buttons. The character sizes Cs represent the character sizes of the button names Bn to be displayed in the buttons. The character arrangements Ca represent the numbers of lines of the button names Bn displayed in the buttons. The process numbers Pn represent image processing numbers (identifiers) associated with the buttons.

The association image selecting unit 220 determines the button numbers bi, the X coordinates bx, the Y coordinates by, the widths bw, and the heights bh to predetermined values according to the maximum number MaxB of buttons. For example, the parameters bx, by, bw, and bh representing the configuration of each custom button are determined in advance such that as the maximum number MaxB of buttons increases, more custom buttons are densely arranged. The association image selecting unit 220 determines the button names Bn, the character sizes Cs, the character arrangements Ca, and the process numbers Pn, in a custom button generating process (to be described below).

Figure 3E:
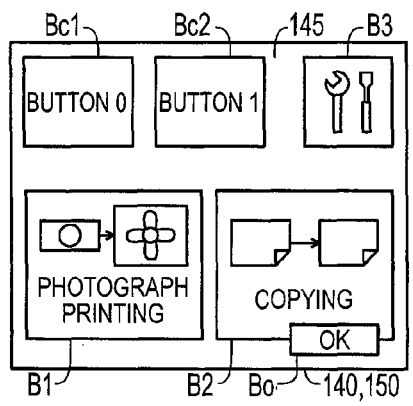

Referring to FIG. 4, in STEP S370, in order to make the user confirm the arrangement of the custom buttons, the display control unit 230 displays an operation screen including the custom buttons, on the display unit 140. FIG. 3E is a schematic view illustrating an example of the operation screen displayed. An operation screen 145 displays two buttons Bc1 and Bc2 and an OK button Bo, in addition to the buttons B1, B2, and B3 of the normal screen 141 of FIG. 3A. The added buttons Bc1 and Bc2 represent custom buttons arranged according to the display button table data Btab (FIG. 5A). The display control unit 230 specifies arrangement of the buttons Bc1 and Bc2 with reference to the display button table data Btab included in the update setting information (not shown) stored in the volatile storage unit 120. Also, in this stage, the button names Bn of the buttons Bc1 and Bc2 have not been determined, and thus temporary button names are displayed in the buttons Bc1 and Bc2. If the user operates the OK button Bo, the display control unit 230 finishes STEP S370 of FIG. 4.

Next, in STEP S380, with reference to the update setting information stored in the volatile storage unit 120, the setting control unit 250 stores data representing the operation parameters finally determined in STEP S315, and the display button table data Btab generated in STEP S360, as a portion of the setting information Si, in the non-volatile storage unit 130. Thereafter, the process of FIG. 4 finishes.

Figure 6:
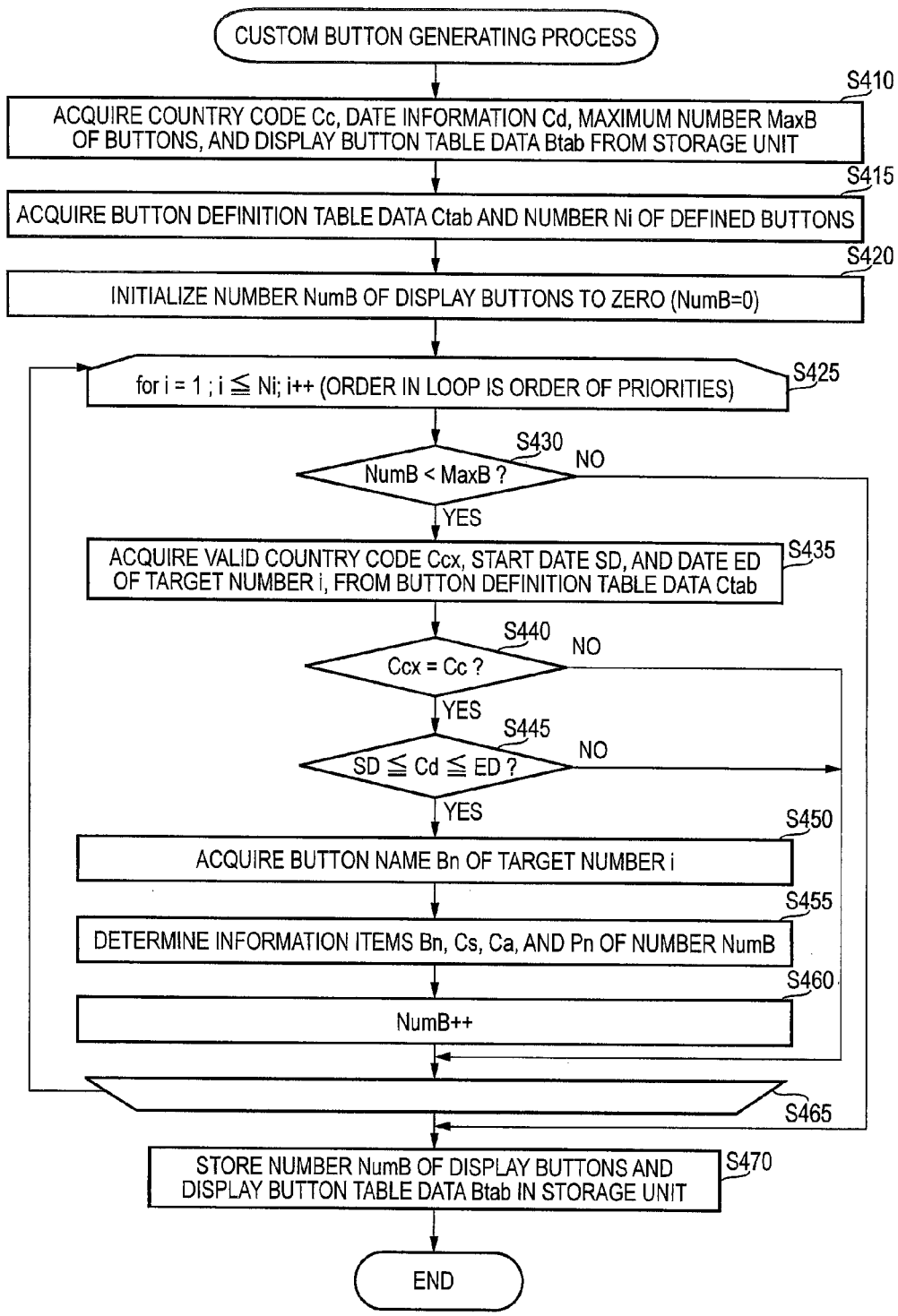
FIG. 6 is a flow chart illustrating a custom button generating process.

In a case where it is determined in STEP S130 of FIG. 2 that the custom button flag is ON state ("YES" in STEP S130), in STEP S140, the custom button generating process is performed. FIG. 6 is a flow chart illustrating the custom button generating process. First, in STEP S410, with reference to the setting information Si of the non-volatile storage unit 130, the association image selecting unit 220 acquires the country code Cc, the date information Cd, the maximum number MaxB of buttons, and the display button table data Btab.

Subsequently, in STEP S415, the association image selecting unit 220 acquires the button definition table data Ctab stored in the non-volatile storage unit 130, and then acquires the number Ni of defined buttons which is the number of buttons defined by the button definition table data Ctab.

FIG. 7 is a schematic view illustrating an example of the button definition table data Ctab. The button definition table data Ctab defines each of a plurality of custom buttons. In the present embodiment, the button definition table data Ctab defines an association among a process number Pn, a valid country code Ccx, a start date SD, an end date ED, a button name Bn, and a priority Pr, for each custom button. The process number Pn is the identifier of image processing associated with the corresponding custom button. As will be described below, in the present embodiment, each custom button is associated with the following image processing. That is, each custom button is associated with image processing including a process of selecting template image data associated with the process number Pn of the corresponding custom button, a process of generating print data by use of the selected template image data, and a process of transmitting the generated print data to the printing execution unit 180. The valid country code Ccx represents a country code where the corresponding custom button is valid. The start date SD and the end date ED represent the start date and end date of a period when the corresponding custom button is valid. In the present embodiment, each of the start date SD and the end date ED is represented by a month and a day. The button name Bn is a character string to be displayed in the corresponding button, and represents the name of the corresponding button. The priority Pr represents the priority for displaying the corresponding button on the display unit 140.

In the example of FIG. 7, as for custom buttons having process numbers "1" to "3", the country codes Cc are "0000", and the button names Bn are "SUMMER GREETING CARD", "NEW YEAR'S CARD", and "CHRISTMAS", respectively. As for custom buttons having process numbers "4" and "5", the country codes Cc are "0001", and the button names Bn are "Halloween" and "Xmas", respectively. Also, the custom button having the process number "1" is a button for printing a summer greeting card, the custom button having the process number "2" is a button for printing a New Year's card, and the custom button having the process number "3" is a button for printing a Christmas card. Also, the custom button having the process number "4" is a button for printing a Halloween card, and the custom button having the process number "5" is a button for printing a Christmas card. All custom buttons are associated with image processing for printing image formed by use of template images (to be described below). Also, the plurality of process numbers Pn are set such that a priority Pr for displaying is higher with respect to a smaller process number Pn.

Referring to FIG. 6, in STEP S420, the association image selecting unit 220 initializes the number NumB of display buttons which is the number of custom buttons selected to be displayed, to zero.

Next, the association image selecting unit 220 performs a loop process from STEP S425 to STEP S465, thereby selecting the custom buttons to be displayed on the display unit 140, from the plurality of custom buttons defined by the button definition table data Ctab. Thereafter, the association image selecting unit 220 updates the display button table data Btab (FIGS. 5A to 5C) such that the display button table data Btab represents the selected custom buttons. In this loop process, the process numbers Pn are sequentially processed from 1. Then, custom buttons of process numbers Pn satisfying conditions (to be described below) are selected.

Specifically, in STEP S425, the association image selecting unit 220 initializes a target number i which is the process number Pn of a process target, to "1". Subsequently, in STEP S430, the association image selecting unit 220 determines whether the number NumB of display buttons is less than the maximum number MaxB of buttons. In a case where the number NumB of display buttons is not less than the maximum number MaxB of buttons ("NO" in STEP S430), the association image selecting unit 220 finishes the loop process, and proceeds to STEP S470. Meanwhile, in a case where the number NumB of display buttons is less than the maximum number MaxB of buttons, in STEP S435, the association image selecting unit 220 acquires the valid country code Ccx, start date SD, and end date ED of the target number i, from the button definition table data Ctab.

Next, in STEPS S440 and S445, the association image selecting unit 220 determines whether the custom button of the target number i satisfies the following two conditions. First, in STEP S440, the association image selecting unit 220 determines whether the country code Cc is the same as the valid country code Ccx. Second, in STEP S445, the association image selecting unit 220 determines whether the date information Cd is within a valid period from the start date SD to the end date ED.

In a case where both of the two conditions are satisfied ("YES" in STEP S440, and "YES" in STEP S445), the association image selecting unit 220 selects the custom button of the target number i as a button to be displayed on the display unit 140. In this case, the association image selecting unit 220 performs STEPS S450, S455, and S460, thereby updating the display button table data Btab (FIGS. 5A to 5C), as will be described below in detail. Next, the association image selecting unit 220 proceeds to STEP S465 in which it finishes the process on the target number i. Thereafter, the association image selecting unit 220 returns to STEP S425 in which it adds "1" to the target number i, and performs the process on the updated target number i.

In a case where at least one of the two conditions is not satisfied, that is, in a case where the determination result of at least one of STEPS S440 and S445 is "NO", the association image selecting unit 220 does not select the custom button of the target number i as a button to be displayed on the display unit 140. In this case, the association image selecting unit 220 skips STEPS S450, S455, and S460, and proceeds to STEP S465 in which it finishes the process on the target number i. Thereafter, the association image selecting unit 220 returns to STEP S425 in which it adds "1" to the target number i, and performs the process on the updated target number i.

Subsequently, STEPS S450, S455, and S460 will be described in detail with reference to FIGS. 5A to 5C. Here, it is assumed that the country code Cc is "0000", and the date information Cd is "December 1". According to the procedure of FIG. 6, first, the process on the target number i of "1" (that is, the process number Pn "1") is performed. The date information Cd (December 1) is out of the valid period (from July 1 to August 15) of the process number Pn "1" of FIG.

7 ("NO" in STEP S445 of FIG. 6). Therefore, the custom button having the process number Pn of 1 is not selected.

Next, the process on the target number i of "2" (that is, the process number Pn "2") is performed. As shown in FIG. 7, the country code Cc "0000" is the same as the valid country code Ccx of the process number Pn "2" of FIG. 7. Further, the date information Cd (December 1) is within the valid period (from November 15 to January 15) of the process number Pn "2" of FIG. 7. Therefore, the custom button having the process number Pn "2" is selected as a button to be displayed. In this case, in STEP S450 of FIG. 6, the association image selecting unit 220 acquires the button name Bn of the target number i from the button definition table data Ctab (FIG. 7). Here, "NEW YEAR'S CARD" which is the button name Bn of the process number Pn "2" is acquired.

Subsequently, in STEP S455 of FIG. 6, the association image selecting unit 220 determines information items Bn, Cs, Ca, and Pn of the display button table data Btab (FIG. 5A). In STEP S455, information items of the same button number bi as the number NumB of display buttons are determined based on the information items of the target number i. In the example of FIG. 5B, the information items Bn, Cs, Ca, and Pn of the button number bi "0" are determined based on the information items of the process number Pn "2" of FIG. 7.

Specifically, the button name Bn of the display button table data Btab is determined to "NEW YEAR'S CARD" which is the button name Bn acquired in STEP S450. The character size Cs and the character arrangement Ca (that is, the number of lines of the button name Bn) are determined such that the button name Bn can be placed in the custom button. For example, the association image selecting unit 220 first determines the character size Cs to a predetermined size (for example, 10.5 pt), and then determines the character arrangement Ca to "1" which is a predetermined value. In a case where the button name Bn according to the determined character size Cs and the determined character arrangement Ca protrudes from the custom button, the association image selecting unit 220 changes the character size Cs to a predetermined smaller size (for example, 9 pt). In a case where the button name Bn according to that character size Cs protrudes from the custom button, the association image selecting unit 220 changes the character arrangement Ca to a predetermined larger value "2". In the example of FIG. 5B, the character size Cs is "10.5", and the character arrangement Ca is "1". The process number Pn is determined to the target number i. In the example of FIG. 5B, the process number Pn is "2".

Referring to FIG. 6, in STEP S460, the association image selecting unit 220 adds "1" to the number NumB of display buttons. Here, the updated number NumB of display buttons is "1". Thereafter, the process on the target number i "2" finishes.

Next, the process on the target number i "3" (that is, the process number Pn "3") is performed. As shown in FIG. 7, the custom button of the process number Pn "3" also satisfies the two conditions ("YES" in STEPS S440 and S445 of FIG. 6). Therefore, in STEP S450, "CHRISTMAS" which is the button name Bn of the process number Pn "3" of FIG. 7 is acquired. Subsequently, in STEP S455, information items Bn, Cs, Ca, and Pn of the same number "1" as the number NumB of display buttons in the display button table data Btab (FIG. 5C) are determined based on the information items of the button of the process number Pn "3" of FIG. 7. FIG. 5C shows an example of the updated display button table data Btab. The button name Bn is "CHRISTMAS", and the character size Cs is "9", and the character arrangement Ca is "2", and the process number Pn is "3".

If information items of all buttons are determined as shown in FIG. 5C, the number NumB of display buttons is updated with the same value as the maximum number MaxB of buttons in STEP S460 of FIG. 6. As a result, the determination result of STEP S430 of the next time becomes "NO", and the process proceeds to STEP S470. In STEP S470, the setting control unit 250 stores the updated number NumB of display buttons, and the updated display button table data Btab, as a portion of the setting information Si, in the non-volatile storage unit 130. Thereafter, the custom button generating process of FIG. 6 finishes.

Additionally, as described in FIG. 7, as a process number Pn is smaller, a priority Pr is higher. Therefore, in the process of FIG. 6, the custom buttons are selected in the order of descending priorities Pr. Also, in a case where the number of custom buttons satisfying the conditions of STEPS S440 and S445 is smaller than the maximum number MaxB of buttons, in a stage after the process of FIG. 6 finishes, the number NumB of display buttons is less than the maximum number MaxB of buttons. In this case, the process of FIG. 6 finishes in a state where the information items Bn, Cs, Ca, and Pn of some button numbers bi of the display button table data Btab (FIG. 5A) have not been determined.

Figure 8:
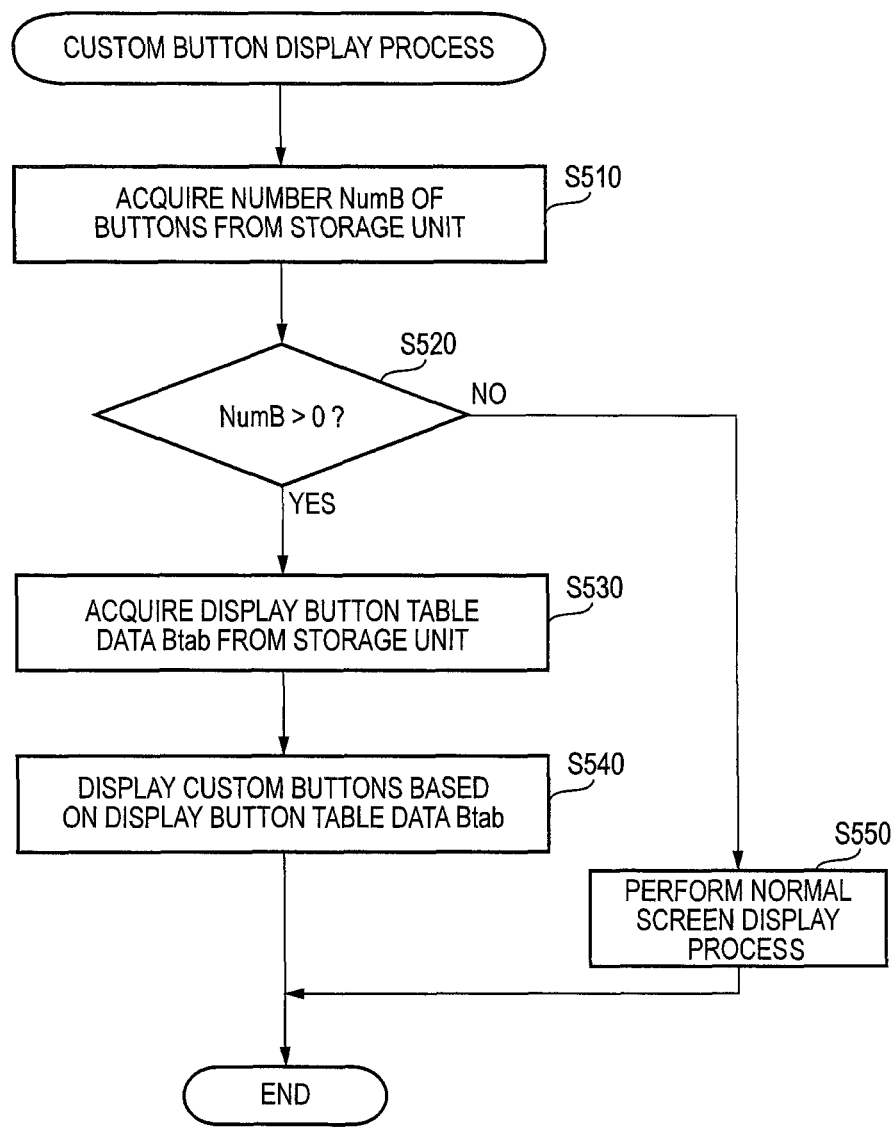
FIG. 8 is a flow chart illustrating a custom button display process.

If the custom button generating process finishes, in STEP S150 of FIG. 2, the display control unit 230 displays the custom buttons selected by the association image selecting unit 220, on the display unit 140. FIG. 8 is a flow chart illustrating the custom button display process. First, in STEP S510, the display control unit 230 acquires the number NumB of display buttons included in the setting information Si stored in the non-volatile storage unit 130.

Subsequently, in STEP S520, the display control unit 230 determines whether the number NumB of display buttons is larger than zero. In a case where the number NumB of display buttons is zero, that is, in a case where any custom button to be displayed has not been detected in the process of FIG. 6 ("NO" in STEP S520), in STEP S550, the display control unit 230 displays the normal screen on the display unit 140. STEP S550 is the same as STEP S180 of FIG. 2. Thereafter, the process of FIG. 8 finishes.

In a case where the number NumB of display buttons is larger than zero ("YES" in STEP S520), in STEP S530, the display control unit 230 acquires the display button table data Btab included in the setting information Si stored in the non-volatile storage unit 130. Subsequently, in STEP S540, the display control unit 230 displays an operation screen including the custom buttons according to the display button table data Btab, on the display unit 140. Thereafter, the process of FIG. 8 finishes.

Figure 3F:
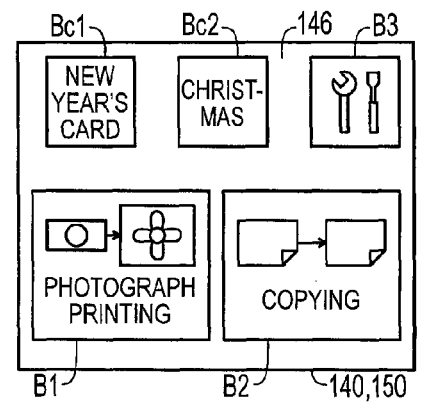

FIG. 3F shows an example of the operation screen including the custom buttons. An operation screen 146 is obtained by displaying the button names in the custom buttons Bc1 and Bc2 of the operation screen 145 of FIG. 3E according to the display button table data Btab (also, the OK button Bo is omitted).

If the custom button display process finishes, the display control unit 230 returns to STEP S130 of FIG. 2. Then, in a state where the multi-function apparatus 100 is ON, the display control unit 230 repeatedly performs the process of FIG. 2. For example, even if the user does not perform any operation, the display control unit 230 performs the process of FIG. 2 at least once a day. Also, if the setting information Si is updated, the display control unit 230 performs the process of FIG. 2.

Figures 9, 10:
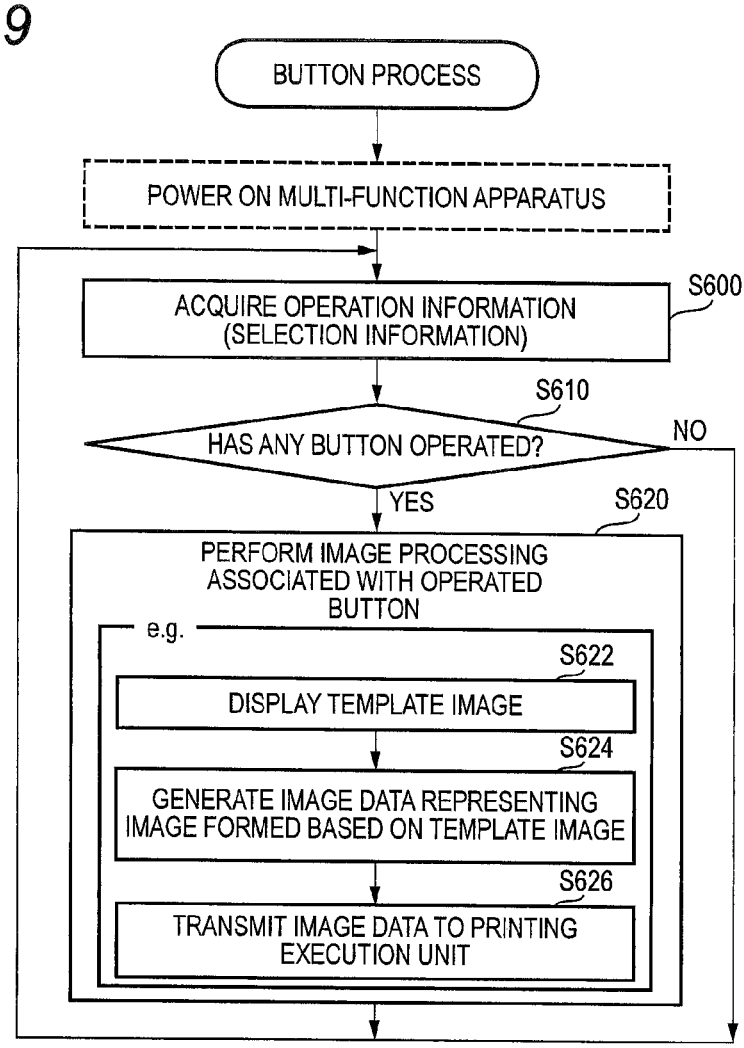
FIG. 9 is a flow chart illustrating a button process.
FIG. 10 is a schematic view illustrating an example of template image group data Tp.

FIG. 9 is a flow chart illustrating a button process which is performed by the printing control unit 240 of the multi-function apparatus 100 (FIG. 1). If the multi-function apparatus 100 is powered on, the printing control unit 240 starts the button process. In this button process, if the user operates a button for printing, for example, the button B1 or B2 of FIG. 3A or the button Bc1 or Bc2 of FIG. 3F, the printing control unit 240 performs image processing (image processing for printing) associated with the operated button.

First, in STEP S600, the selection information acquiring unit 212 acquires data (referred to as operation information) representing the position on the operation unit 150 operated by the user, from the operation unit 150. The operation information is information specifying the button selected from the buttons displayed on the display unit 140 by the user. Hereinafter, the operation information is also referred to as selection information.

Subsequently, in STEP S610, based on the selection information, the selection information acquiring unit 212 determines whether any button has been operated by the user. In a case where any button of the operation unit 150 has not been operated by the user ("NO" in STEP S610), the printing control unit 240 returns to STEP S600.

In a case where any button is operated by the user ("YES" in STEP S610), in STEP S620, the printing control unit 240 performs image processing associated with the operated button. Also, in a case where the operated button is not a button for performing image processing for image printing (for example, the setup button B3 of FIG. 3A), a processing unit associated with the operated button performs a process associated with the operated button (as will be described below in detail).

In STEP S620 of FIG. 9, as examples of processes, which are performed in a case where a custom button has been operated by the user, STEPS S622, S624, and S626 are shown. In STEP S622, the display control unit 230 displays available template images on the display unit 140 in order to allow the user to select one template image to be used in image processing, before the image processing is performed by the printing control unit 240.

FIG. 10 is a schematic view illustrating an example of the template image group data Tp. As shown in FIG. 10, the template image group data Tp includes a plurality of template image data items Tp11, Tp21, Tp22, Tp23, and Tp31. One template image data item represents one template image. Also, each template image data item is associated with a process number Pn. For example, in the example of FIG. 10, one template image data item Tp11 is associated with the process number Pn "1" (whose button name Bn is "SUMMER GREETING CARD"), and three template image data items Tp21, Tp22, and Tp23 are associated with the process number Pn "2" (whose button name Bn "NEW YEAR'S CARD"), and one template image data item Tp31 is associated with the process number Pn "3" (whose button name Bn is "CHRISTMAS"). As the format of the template image data items, an arbitrary format (for example, a JPEG format or a PNG format) can be used.

The display control unit 230 specifies a process number Pn associated with the operated custom button, with reference to the display button table data Btab (FIG. 5C) included in the setting information Si stored in the non-volatile storage unit 130. Thereafter, with reference to the template image group data Tp, the display control unit 230 displays template images associated with the specified process number Pn, on the display unit 140.

Figure 11:
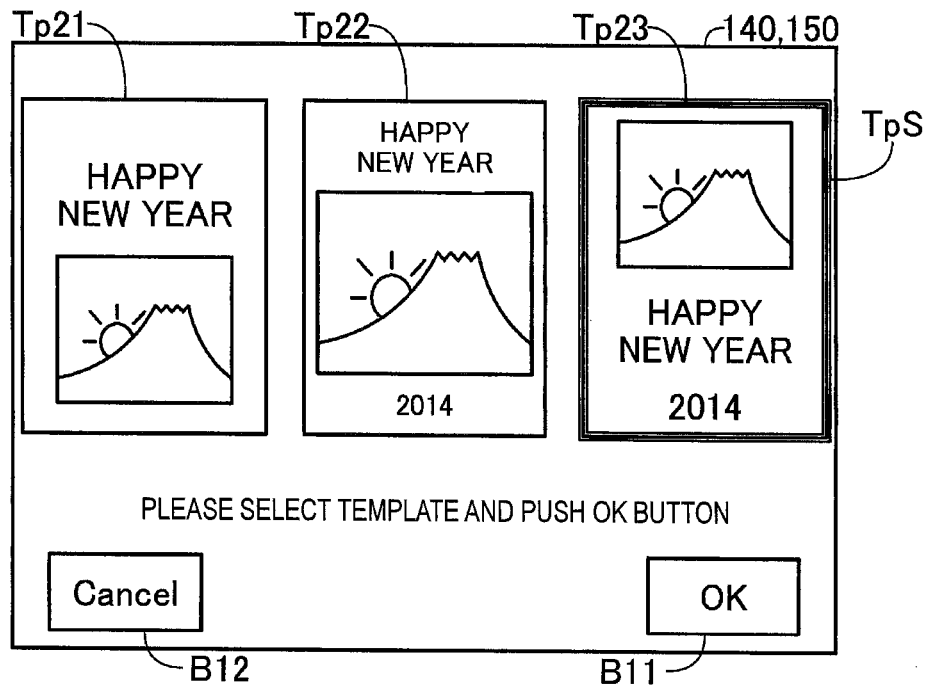
FIG. 11 is a schematic view illustrating an example of a confirmation screen.

FIG. 11 shows an example of a confirmation screen which is displayed in a case where the user has operated the first custom button Bc1 of FIG. 3F. As shown in FIG. 5C, the first custom button Bc1 (whose button number bi is 0) is associated with the process number Pn "2". Further, as shown in FIG. 10, the process number Pn "2" is associated with three template image data items Tp21 to Tp23. The confirmation screen of FIG. 11 displays three template images represented by the available template image data items Tp21 to Tp23, a selection frame TpS representing one selected template image, an OK button B11, and a Cancel button B12. The user can touch a position on the operation unit 150 (the touch panel) overlapping a desired template image, thereby selecting the desired template image. The display control unit 230 displays the selection frame TpS around the selected template image. If the user operates the Cancel button B12, the display control unit 230 finishes STEP S620, thereby canceling performance of the image processing, and then returns to STEP S600. If the user selects one template image, and then operates the OK button B11, the display control unit 230 finishes STEP S622, and proceeds to STEP S624.

Figure 12:
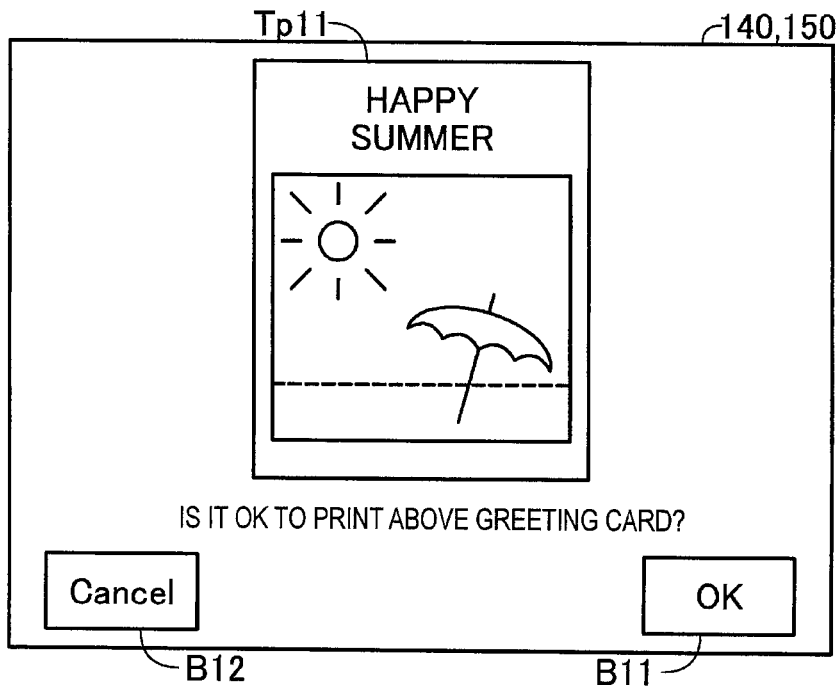
FIG. 12 is a schematic view illustrating another example of the confirmation screen.

FIG. 12 shows an example of a confirmation screen in a case where the total number of available template images is one. FIG. 12 shows an example in a case where the process number Pn associated with the operated custom button is "1". In a case where the date information Cd is, for example, August 1 within the valid period (from July 1 to August 15) of the process number Pn "1" shown in FIG. 7, a custom button associated with the process number Pn "1" can be displayed. In a case where the user has operated that custom button, the display control unit 230 displays a template image represented by the template image data item Tp11 (FIG. 10) associated with the process number Pn "1". Display of the selection frame TpS is omitted. The user can confirm the displayed template image, and operate the OK button B11 or the Cancel button B12.

In STEP S624 of FIG. 9, the printing control unit 240 generates image data representing an image formed by use of the selected template image. In a case where a third template image data item Tp23 has been selected as shown in FIG. 11, the printing control unit 240 generates image data for printing, based on the third template image data item Tp23. At this time, the printing control unit 240 may change the template image according to an instruction of the user. For example, the printing control unit 240 may synthesize the template image and a photographic image designated by the user.

As the format of image data to be generated, an arbitrary format which can be interpreted by the printing execution unit 180 can be used (hereinafter, image data which is generated will be referred to as print data). Print data is generated, for example, by a resolution converting process, a color converting process, or a halftone process. The resolution converting process is a process of converting the pixel density of image data into a pixel density for a printing process. The color converting process is a process of converting the color space of image data from a specific color space (a color space of red R, green G, and blue B) into a color space of color materials (for example, a color space of cyan C, magenta M, yellow Y, and black K). The halftone process is a process of determining arrangement of dots of the individual color materials based on the grayscale values of the individual color materials (that is, the grayscale values of multi-level image data after color conversion). As the halftone process, for example, a dither method or an error diffusion method can be used. The print data can include a command for the printing execution unit 180.

Next, in STEP S626, the printing control unit 240 transmits the generated print data to the printing execution unit 180. The printing execution unit 180 prints the image according to the received print data. Thereafter, STEP S626, that is, STEP S620 finishes, and the process returns to STEP S600. Then, the process of FIG. 9 is repeated.

As described above, in the first embodiment, based on the date information Cd, the association image selecting unit 220 selects custom buttons to be displayed on the display unit 140, from a plurality of custom buttons that is used to perform printing processes for printing images different from one another (FIG. 6). Thereafter, the display control unit 230 displays the selected custom buttons on the display unit 140 (FIG. 8). The selection information acquiring unit 212 acquires selection information specifying a custom button selected from the custom buttons displayed on the display unit 140 by the user (STEPS S600 and S610 of FIG. 9). The printing control unit 240 performs image processing associated with the custom button specified by the selection information, thereby instructing the printing execution unit 180 to print an image (STEP S620 of FIG. 9). Here, in a case where the date information Cd represents August 1, the association image selecting unit 220 selects the custom button (not shown) associated with the process number Pn "1" of FIG. 7, and in a case where the date information Cd represents December 1, the association image selecting unit 220 selects the custom buttons (FIG. 3F) associated with the process numbers Pn "2" and "3" of FIG. 7. In this way, custom buttons appropriate for the date information Cd are displayed on the display unit 140. Therefore, it is possible to easily perform image processing appropriate for the date information Cd.

Also, as described in FIGS. 9 and 10, image processing associated with an image (for example, the custom button Bc1 or Bc2 of FIG. 3F) relative to each process number Pn includes a process of instructing the printing execution unit 180 to print an image (for example, an image represented by the template image data item Tp21 of FIG. 11) formed by use of a template image for the corresponding process number Pn. Therefore, it is possible to easily print an image formed by use of a template image appropriate for the date information Cd. For example, in a case where the date information Cd represents August 1, it is possible to easily perform printing using a template image for a summer greeting card as shown in FIG. 12. In a case where the date information Cd represents December 1, it is possible to easily perform printing using a template image for a new year greeting card as shown in FIG. 11.

Also, the association image selecting unit 220 selects a process number Pn (that is, a custom button) whose valid period includes the date information Cd (FIG. 6), regardless of the current year. Therefore, it is possible to easily perform image processing appropriate for the date information Cd.

Also, in the embodiment shown in FIG. 7, even in the case where the date information Cd represents August 1, if the country code Cc is not "0000" but "0001", the association image selecting unit 220 does not select the custom button of the process number Pn "1" ("NO" in STEP S440 of FIG. 6). Meanwhile, in a case where the date information Cd represents August 1, and the country code Cc is "0000", the association image selecting unit 220 selects the custom button of the process number Pn "1" ("YES" in STEP S440 and "YES" in STEP S445). As a result, it is possible to easily perform image processing appropriate for the country code Cc. For example, events using printed images like greetings of summer greeting cards and New Year's greetings may differ from country to country. Therefore, if a custom button associated with the same country code Cc as the valid country code Ccx is selected, it is possible to easily perform image processing for processing (for example, printing) an image appropriate for an event which differs from country to country.

Also, as shown in FIG. 7, in a case where the date information Cd is not limited to August 1 and is included the valid period (from July 1 to August 15) of the process number Pn "1" including August 1, the association image selecting unit 220 selects the custom button of the process number Pn "1". Also, in a case where the date information Cd is not limited to December 1 and is included the valid period (from November 15 to January 15) of the process number Pn "2" including December 1, the association image selecting unit 220 selects the custom button of the process number Pn "2". Therefore, it is possible to easily perform image processing appropriate for the valid period.

Also, as described in STEP S350 of FIG. 4, the maximum number information acquiring unit 214 acquires the maximum number MaxB of buttons representing the maximum number of custom buttons which can be displayed on the display unit 140, as information selected by the user. Therefore, it is possible to suppress more than the number of custom buttons desired by the user from being displayed, and thus it is possible to appropriately perform selection of custom buttons.

Also, as described in FIG. 7, a plurality of custom buttons is associated with the priorities Pr, respectively. Further, as described in FIG. 6, in a case where the number of custom buttons selectable according to the date information Cd is L larger than the maximum number MaxB of buttons, the association image selecting unit 220 selects as many custom buttons as the maximum number MaxB of buttons, according to the priorities Pr. Therefore, the association image selecting unit 220 can appropriately select as many custom buttons as the maximum number MaxB of buttons.

Also, as described in STEP S380 of FIG. 4, the custom button flag and the display button table data Btab are stored in the non-volatile storage unit 130 (STEP S380). Thereafter, if the multi-function apparatus 100 is powered off, and then is powered on again, screens are displayed based on the information stored in the non-volatile storage unit 130, according to the procedure of FIG. 2 (STEPS S150 and S180). In the case where the custom button flag is ON state, the operation screen (for example, the operation screen 146 of FIG. 3F) which is displayed in STEP S150 is a screen which is displayed on the display unit 140 before it becomes possible to operate for the first time for the user after the multi-function apparatus 100 is powered on. The printing control unit 240 displays the custom buttons Bc1 and Bc2, as a portion of the operation screen 146, on the display unit 140. Therefore, after the multi-function apparatus 100 is powered on, the user can select a custom button without performing a complicated operation, and thus it is possible to easily perform appropriate image processing.

Also, as described in FIGS. 9, 10, and 11, it may be possible to use a plurality of template images in image processing associated with a custom button selected by the user. In this case, in STEP S622 of FIG. 9, the display control unit 230 displays the plurality of available template images on the display unit 140 in order to allow the user to select one template image to be used for the image processing, before the image processing is performed by the printing control unit 240. Therefore, the user can select a desired template image.

Also, in a case where it is possible to use one template image in image processing associated with a custom button selected by the user, display of a confirmation screen as shown in FIG. 12 may be omitted. That is, the display control unit 230 does not control the display unit 140 such that the display unit 140 displays the one template image, and if the user operates the custom button, the printing control unit 240 may use the one template image to perform image processing. According to this configuration, even if the user does not perform a complicated operation, image processing is performed. Therefore, it is possible to implement appropriate processing according to the total number of available template images. Also, in a case where any template image is selected a predetermined number of times (for example, three times), display of a confirmation screen as shown in FIG. 11 may be omitted. In this case, if the user operates a corresponding custom button, the printing control unit 240 may use the selected template image to perform image processing.

B. Second Embodiment

FIG. 13 is a schematic view illustrating another embodiment of the button definition table data. Button definition table data Ctab2 of FIG. 13 is different from the button definition table data Ctab of FIG. 7 in that the button definition table data Ctab2 additionally includes the start dates PSD and end dates PED of priority periods. A priority period represents a period when a corresponding custom button is preferentially selected regardless of its priority Pr. The custom button generating process of FIG. 6 can be modified so as to select a custom button in view of priority periods (as will be described below in detail). The processes of FIGS. 2, 4, 8, and 9 are performed similarly to the first embodiment. The configuration of an image processing system which can be used in the second embodiment is the same as the configuration of the image processing system 1000 shown in FIG. 1.

At the lower portion of FIG. 13, examples of process numbers Pn (that is, custom buttons) which are selected in a period from November 15 to January 5 are shown. Here, it is assumed that the maximum number MaxB of buttons is "1", and any one of the process numbers Pn "2" and "3" is selected. As shown in FIG. 13, the valid period of the process number Pn "2" is from November 15 to January 15, and the valid period of the process number Pn "3" is from November 25 to December 25. Therefore, from November 15 to the day before November 25, the process number Pn "2" is selected, and from the data after December 25 to January 5, the process number Pn "2" is selected. From November 25 to December 25, the process numbers Pn "2" and "3" are candidates. In principle, the process number Pn "2" is selected according to the priorities Pr. However, for the process number Pn "3", a priority period from December 20 to December 25 has been set. Therefore, in this priority period, the association image selecting unit 220 selects the process number Pn "3", regardless of the priorities Pr. The custom button generating process of FIG. 6 can be modified such that if the date information Cd is included in the priority period of a custom button, the corresponding custom button is selected regardless of the priorities Pr (not shown).

If the priorities Pr and priority periods are combined as described above, it is possible to flexibly switch custom buttons to be selected according to the date information Cd. Also, in the period from November 25 to December 25, two custom buttons (the process numbers Pn "2" and "3") more than the maximum number MaxB of buttons (which is "1" here) are selectable according to the date information Cd. Hereinafter, a period when custom buttons more than the maximum number MaxB of buttons are selectable according to the date information Cd will be referred to as an excess period. In the example of FIG. 13, in a portion of the excess period (here, from November 25 to the day before December 20), the process number Pn "2" is selected, and in the other portion of the excess period (here, from December 20 to December 25), the process number Pn "3" is selected. Therefore, it is possible to suppress any custom button from being mostly displayed in the excess period.

C. Third Embodiment

FIG. 14 is a schematic view illustrating another embodiment of the button definition table data. Button definition table data Ctab3 of FIG. 14 is different from the button definition table data Ctab of FIG. 7 in that the button definition table data Ctab2 additionally includes reference dates D1. Each reference date D1 represents a date which is a reference for preferentially selecting a corresponding custom button regardless of the priorities Pr in an excess period. The custom button generating process of FIG. 6 can be modified so as to select a custom button in view of the reference dates D1 (as will be described below in detail). The processes of FIGS. 2, 4, 8, and 9 are performed similarly to the first embodiment. The configuration of an image processing system which can be used in the third embodiment is the same as the configuration of the image processing system 1000 shown in FIG. 1.

At the lower portion of FIG. 14, examples of process numbers Pn which are selected in a period from November 15 to January 5 are shown. Here, it is assumed that the maximum number MaxB of buttons is "1", and any one of the process numbers Pn "2" and "3" is selected. In an excess period from November 25 to December 25, the process numbers Pn "2" and "3" are candidates. In the excess period, the association image selecting unit 220 selects a custom button for which the difference between the reference date D1 and the date represented by the date information Cd is the smallest. In FIG. 14, December 13 which is a date between the reference date D1 (December 15) of the process number Pn "2" and the reference date D1 (December 10) of the process number Pn "3" is shown. In a period from November 25 to the day before December 13, the process number Pn "3" is selected, and in a period from December 13 to December 25, the process number Pn "2" is selected. The custom button generating process of FIG. 6 can be modified such that in a case where the date information Cd is included in the valid periods of a plurality of custom buttons, a custom button for which the difference between the reference date D1 and the date represented by the date information Cd is the smallest is selected regardless of the priorities Pr (although not shown in the drawing).

If the reference dates D1 and the priority periods are combined as described above, it is possible to flexibly switch custom buttons to be selected according to the date information Cd. Also, in a portion (here, from November 25 to the day before December 13) of the excess period, the process number Pn "3" is selected, and in the other portion (here, from December 13 to December 25) of the excess period, the process number Pn "2" is selected. Therefore, it is possible to suppress any custom button from being mostly displayed in an excess period.

D. Modifications (1) In each of the above described embodiments, the association image selecting unit 220 can acquire the button definition table data Ctab (FIG. 7) from the server 400. As the timing to acquire the button definition table data Ctab, an arbitrary timing can be used. For example, the association image selecting unit 220 may automatically acquire the latest button definition table data Ctab from the server 400, periodically (for example, once a day). Alternatively, the association image selecting unit 220 may acquire the button definition table data Ctab from the server 400 in response to an instruction of the user. Also, the association image selecting unit 220 may use the button definition table data Ctab stored in advance in the non-volatile storage unit 130, without acquiring the button definition table data Ctab from the server 400. Also, the association image selecting unit 220 may change an arbitrary item of the button definition table data Ctab, in response to an instruction of the user. For example, in response to an instruction of the user, the association image selecting unit 220 may change the start date SD and end date ED of a process number Pn designated by the user.

(2) The template images are not limited to images representing greeting cards and may be any other arbitrary images. For example, templates of birthday cards or business documents may be used. In any case, the printing control unit 240 can acquire the latest template image group data Tp (FIG. 10) from the server 400. As the timing to acquire the template image group data Tp, an arbitrary timing can be used. For example, the printing control unit 240 may automatically the template image group data Tp from the server 400, regularly (for example, once a day). Alternatively, the printing control unit 240 may acquire the template image group data Tp from the server 400, in response to an instruction of the user. Also, the printing control unit 240 may use the template image group data Tp stored in advance in the non-volatile storage unit 130, without acquiring the template image group data Tp from the server 400.

Also, the printing control unit 240 may use template image data prepared by the user. In this case, it is preferable that in response to an instruction of the user, the association image selecting unit 220 should add data defining custom buttons for implementing printing using template images prepared by the user, to the button definition table data Ctab.

(3) A method of defining valid dates of a custom button is not limited to a method using a period, and may be any other arbitrary method. For example, dates defined by a month and a day can be used. In this case, valid dates are on the same date every year. These valid dates can be applied, for example, to a custom button for printing a birthday card. The user may determine valid dates to desired birthdays. Also, valid dates may be determined by a day, regardless of years and months. In this case, valid dates are on the same day of every month. These valid dates can be applied, for example, to a custom button for printing a template of a business document to be submitted on the same day of every month. Also, valid dates may be determined by a day of the week, regardless of years, months, and days. In this case, valid dates are on the same day of every week. These valid dates can be applied, for example, a custom button for printing a template of a business document to be submitted on the same day of every week. In any case, as the date information Cd, information (for example, at least one of a month, a day, and a day of the week) to be compared with a valid date may be used.

(4) A method of determining an area where a custom button is valid is not limited to a method using a country, and may be any other arbitrary method. For example, an area (for example, a city) smaller than a country may be used, and an area (a wider area, for example, Asia or Europe) larger than a country may be used. Also, determination (STEP S440 of FIG. 6) based on a valid area may be omitted.

(5) The maximum number MaxB of buttons may be a fixed value. In this case, if excessive custom button information is omitted from the button definition table data Ctab, it is possible to prevent an excess period from occurring. In this case, it is possible to omit the priorities Pr.

Also, the button definition table data Ctab may define a number of custom buttons having the same valid date. In this case, even if the maximum number MaxB of buttons is three or more, an excess period can occur. Even in this case, the association image selecting unit 220 may select custom buttons according to the priorities Pr. Also, the priorities Pr may be renumbered for each country code Cc.

Also, the association image selecting unit 220 may select custom buttons based on priority periods or reference dates D1 like in the embodiments of FIGS. 13 and 14. In general, in a case where the number of custom buttons selectable according to the date information Cd is maintained at L larger than the maximum number MaxB of buttons for K days (wherein K is an integer of 2 or greater), the association image selecting unit 220 may select custom buttons as follows. That is, in a part of the K days, the association image selecting unit 220 selects a first combination composed of as many custom buttons as the maximum number MaxB of buttons. Also, in the other part of the K days, the association image selecting unit 220 selects a second combination composed of as many custom buttons as the maximum number MaxB of buttons and including at least one custom button different from those of the first combination. A method of determining the first combination and the second combination is not limited to a method using priority periods (FIG. 13) or a method using reference dates D1 (FIG. 14), and may be any other arbitrary method.

(6) The display control unit 230 may display custom buttons on the display unit 140, not only before it becomes possible for the user to operate for the first time after the multi-function apparatus 100 is powered on, but also if the multi-function apparatus 100 is in an arbitrary state. For example, if the user operates a specific button displayed on the display unit 140, the display control unit 230 may display custom buttons on the display unit 140.

(7) Images (referred to as process association images) that is used to perform image processing for image printing are not limited to custom buttons and may be arbitrary images selectable to perform image processing by the user. For example, process association images may be options included in a menu displayed on the display unit 140.

(8) An image processing apparatus for displaying process association images, and performing image processing associated with a process association image selected by a user is not limited to the multi-function apparatus 100, and may be a variety of apparatuses. For example, the image processing apparatus may be a personal computer, a digital camera, or a mobile phone. In any case, the printing execution unit 180 may be a separate apparatus connected to the image processing apparatus. For example, the printing execution unit 180 may be a FAX machine connected to a network such as a phone line. In this case, the printing control unit 240 may generate FAX data as image data in a format that is used to print by the printing execution unit 180 (that is, the FAX machine), and call a phone number designated by the user, and transmit the FAX data to the printing execution unit 180 (that is, the FAX machine). According to the received FAX data, the FAX machine prints images represented by the FAX data. The FAX data is generated, for example, based on template image data associated with custom buttons. Also, the FAX data is a kind of print data which is image data having a format that is used to print by the printing execution unit. Also, the display unit 140 may be a separate apparatus connected to the image processing apparatus. Also, a plurality of apparatuses (for example, computers) capable of communication with one another through a network may share a function of performing the process of acquiring the date information, the process of selecting process association images, the process of controlling the display unit such that the display unit displays the process association images, the process of acquiring selection information, and the process of performing image processing, thereby controlling the printing execution unit such the printing execution unit prints an image, thereby providing the above described function as a whole (a system including these apparatuses corresponds to the image processing apparatus).

In each of the above described embodiments, some of components implemented by hardware may be replaced by software, and conversely, some or all of components implemented by software may be replaced by hardware. For example, the function of the association image selecting unit 220 of FIG. 1 may be implemented by a dedicated hardware circuit having a logic circuit.

Also, in a case where some or all of the functions of this disclosure are implemented by a computer program configured by instructions, this program can be stored in a computer-readable recording medium (for example, a recording medium which is not temporary) to be provided. The program may be recorded on a recording medium (a computer-readable recording medium) to be provided for use, or may be recorded on a recording medium (a computer-readable recording medium) to be provided and be copied in another recording medium (a computer-readable recording medium) for use. Examples of the computer-readable recording media include not only portable recording media such as memory cards and CD-ROMs, but also internal storage devices such as various ROMs installed in computers, and external storage devices such as hard disk drives connected to computers.

Although embodiments and modifications of the invention have been described above, the embodiments are provided for the purpose of helping better understanding of the invention but do not limit the scope of the invention. The invention may include alterations, changes, and modifications of the embodiments without departing from the scope of claims, and also includes equivalents thereof.

What is claimed is:

1. An image processing apparatus comprising:
a processor; and
memory storing instructions therein that, when executed by the processor, cause the processor to perform:
acquiring date information determined based on a current date;
selecting an icon to be displayed on a display unit, according to the date information, from a plurality of icons that is used to execute image processing for printing different images;
controlling the display unit such that the display unit displays the selected icon;
acquiring selection information specifying an icon selected from the icon displayed on the display unit; and
controlling a printing execution unit such that the printing execution unit prints an image by executing the image processing associated with the icon specified by the selection information,
wherein in a case where the date information represents a first date included in a first period, the processor, in the selecting, is configured to select a first icon, which is associated with the first period, from the plurality of icons,
wherein in a case where the date information represents a second date included in a second period, the processor, in the selecting, is configured to select a second icon, which is associated with the second period, from the plurality of icons,
wherein, after the acquiring the selection information specifying an icon selected from the icon displayed on the display unit, the processor is configured to control the display unit to display a confirmation screen for receiving a printing instruction to execute the printing;
wherein the processor, when executing instruction stored in the memory, performs acquiring maximum number information representing the maximum number of icons capable of being displayed on the display unit;
wherein in a case where the number of icons selectable according to the date information is larger than the maximum number over a predetermined period that is two or more days:
in a part of the predetermined period, the processor, in the selecting, selects a first combination composed of maximum number of icons; and
in another part of the predetermined first period, the processor, in the selecting, selects a second combination composed of a selectable number of icons and including at least one icon different from the first combination.

2. An image processing apparatus comprising:
a processor; and
memory storing instructions therein that, when executed by the processor, cause the processor to perform:
acquiring date information determined based on a current date;
selecting an icon to be displayed on a display unit, according to the date information, from a plurality of icons that is used to execute image processing for printing different images;
controlling the display unit such that the display unit displays the selected icon;
acquiring selection information specifying an icon selected from the icon displayed on the display unit; and
controlling a printing execution unit such that the printing execution unit prints an image by executing the image processing associated with the icon specified by the selection information,
wherein in a case where the date information represents a first date included in a first period, the processor, in the selecting, is configured to select a first icon, which is associated with the first period, from the plurality of icons,
wherein in a case where the date information represents a second date included in a second period, the processor, in the selecting, is configured to select a second icon, which is associated with the second period, from the plurality of icons,
wherein, after the acquiring the selection information specifying an icon selected from the icon displayed on the display unit, the processor is configured to control the display unit to display a confirmation screen for receiving a printing instruction to execute the printing;
wherein, in a case where a plurality of template images can be used in the image processing associated with the icon specified by the selection information, the processor, in the controlling, controls the display unit such that the display unit displays the plurality of template images in order to allow a user to select one template image to be used in the image processing, before the image processing is executed by the printing execution unit, and wherein, in a case where one template image can be used in the image processing associated with the icon specified by the selection information, the processor, in the controlling, does not control the display unit such that the display unit displays the one template image, and the printing execution unit uses the one template image to execute the image processing.

3. An image processing apparatus comprising:
a processor; and
memory storing instructions therein that, when executed by the processor, cause the processor to perform:
acquiring date information determined based on a current date;
selecting an icon to be displayed on a display unit, according to the date information, from a plurality of icons that is used to execute image processing for printing different images;
controlling the display unit such that the display unit displays the selected icon;
acquiring selection information specifying an icon selected from the icon displayed on the display unit; and
controlling a printing execution unit such that the printing execution unit prints an image by executing the image processing associated with the icon specified by the selection information,
wherein in a case where the date information represents a first date included in a first period, the processor, in the selecting, is configured to select a first icon, which is associated with the first period, from the plurality of icons,
wherein in a case where the date information represents a second date included in a second period, the processor, in the selecting, is configured to select a second icon, which is associated with the second period, from the plurality of icons,
wherein, after the acquiring the selection information specifying an icon selected from the icon displayed on the display unit, the processor is configured to control the display unit to display a confirmation screen for receiving a printing instruction to execute the printing;
wherein, in a case where a plurality of template images can be used in the image processing associated with the icon specified by the selection information, the processor:
selects the icon to be displayed on the display unit; and
controls the display unit such that the display unit displays the plurality of template images in order to allow a user to select one template image to be used in the image processing, before the image processing is executed by the printing execution unit; and
controls, in a case where both a template image information indicating the selected one template image from the plurality of template images and the printing instruction is acquired, the printing execution unit to print the image,
wherein, in a case where one template image can be used in the image processing associated with the icon specified by the selection information, the processor:
selects the icon to be displayed on the display unit, and
controls the display unit such that the display unit displays the one template image, before the image processing is executed by the printing execution unit; and
controls, in a case where the printing instruction is acquired, the printing execution unit to print the image, without acquiring the template image information.

4. The image processing apparatus according to claim 3,
wherein the image processing associated with the first icon includes a process of controlling the printing execution unit such that the printing execution unit prints an image formed based on a first template image, and
wherein the image processing associated with the second icon includes a process of controlling the printing execution unit such that the printing execution unit prints an image formed based on a second template image.

5. The image processing apparatus according to claim 3,
wherein, in the case where the date information represents the first date, the processor, in the selecting, selects the first icon, regardless of a current year, and
wherein, in the case where the date information represents the second date, the processor, in the selecting, selects the second icon, regardless of the current year.

6. The image processing apparatus according to claim 3,
wherein the processor, when executing instruction stored in the memory, performs operations comprising:
acquiring area information representing an area where the printing execution unit is controlled,
wherein in a case where the date information represents the first date and where the area information represents a first area, the processor, in the selecting, does not select the first icon, and
wherein in a case where the date information represents the first date and where the area information represents a second area, the processor, in the selecting, selects the first icon.

7. The image processing apparatus according to claim 3,
wherein in a case where the date information indicates the first period including the first date, the processor, in the selecting, selects the first icon, regardless of a current year, and
wherein in a case where the date information indicates the second period including the second date, the processor, in the selecting, selects the second icon, regardless of the current year.

8. The image processing apparatus according to claim 3,
wherein the processor, when executing instruction stored in the memory, performs operations comprising:
acquiring maximum number information representing the maximum number of icons capable of being displayed on the display unit.

9. The image processing apparatus according to claim 8,
wherein the plurality of icons is associated with priorities, respectively, and
wherein in a case where a selectable number of icons according to the date information is larger than the maximum number, the processor, in the selecting, selects icons according to the maximum number and priorities.

10. The image processing apparatus according to claim 3,
wherein, when it becomes possible to operate for the first time after the image processing apparatus is powered, the processor controls the display unit such that the display unit displays an image including the icons.

11. The image processing apparatus according to claim 3, wherein the confirmation screen includes a template image, which is associated with the icon specified by the selection information and is used for executing the image processing.

12. The image processing apparatus according to claim 3, wherein the processor further performs acquiring period information, which is information indicating a period where each of the plurality of icons is to be displayed, the period information including a start date, from which the associated icon is displayed, and an end date, until which the associated icon is displayed, wherein the processor, in the selecting, is configured to determine whether date information determined based on a current date is on or after the start date and on or before the end date and to select an icon according to the determination.

\* \* \* \* \*